Figure 2:
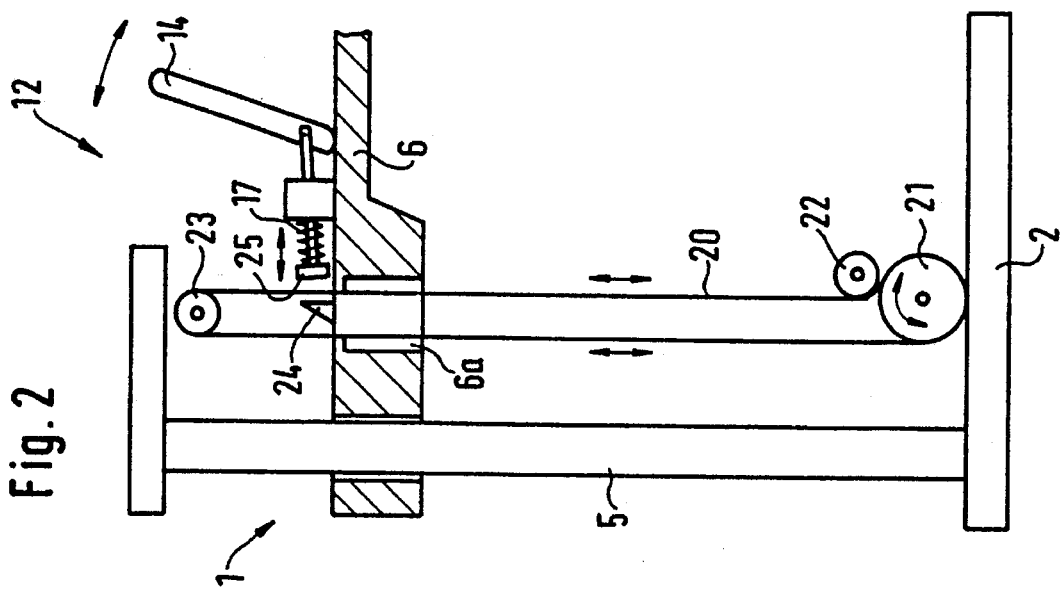

United States Patent

Bossart

[11] Patent Number: 5,589,135
[45] Date of Patent: Dec. 31, 1996

[54] HEIGHT ADJUSTABLE STAND FOR LABORATORY EQUIPMENT

[75] Inventor: Erwin Bossart, Flawil, Switzerland

[73] Assignee: Buchi Laboratoriums - Technik AG, Flawil, Switzerland

[21] Appl. No.: 948,439

[22] Filed: Sep. 22, 1992

[30] Foreign Application Priority Data

Oct. 18, 1991 [CH] Switzerland .............................. 3063/91

[51] Int. Cl.⁶ ......................................................... B01L 9/06
[52] U.S. Cl. .......................... 422/99; 422/104; 202/238; 203/DIG. 2; 248/295.11; 74/89.15; 74/89.22; 474/148; 474/158; 474/164; 474/205; 474/206
[58] Field of Search ................................ 187/24, 25, 267; 254/98, 99, 100; 422/99, 102, 103, 104; 267/177; 202/238; 203/DIG. 2; 248/295.1; 74/89.15, 89.22; 474/148, 158, 164, 205, 206, 273

[56] References Cited

U.S. PATENT DOCUMENTS

| | | | |
|---|---|---|---|
| 269,874 | 1/1883 | Moore et al. | 248/295.1 X |
| 303,002 | 8/1884 | Groebl | 248/295.1 X |
| 312,938 | 2/1885 | Walter | 248/295.1 |
| 367,512 | 8/1887 | Garber et al. | 248/295.1 X |
| 576,547 | 2/1897 | Campbell | 248/295.1 X |
| 1,310,752 | 7/1919 | Hond et al. | 74/424.8 A |
| 1,543,631 | 6/1925 | Todt | 74/424.8 A |
| 1,721,227 | 7/1929 | Monley | 74/424.8 A |
| 3,313,166 | 4/1967 | Elster | 474/148 |
| 3,546,930 | 12/1970 | Flarsheim | 74/89.15 |
| 3,669,440 | 6/1972 | Kartasuk et al. | 74/424.08 A X |
| 3,730,008 | 5/1973 | Sheesley | 74/424.08 A X |
| 3,762,232 | 10/1973 | Müller | 74/89.22 |
| 3,842,690 | 10/1974 | Gulick | 74/424.8 A |
| 3,858,452 | 1/1975 | Gatland et al. | 74/89.15 |
| 3,974,709 | 8/1976 | Jonson et al. | 74/424.8 A |
| 4,155,268 | 5/1979 | Lee et al. | 74/424.8 A |
| 4,155,269 | 5/1979 | Lee et al. | 74/424.8 A |
| 4,509,936 | 4/1985 | Müller | 474/148 |
| 4,522,684 | 6/1985 | Saito | 422/99 X |
| 4,553,951 | 11/1985 | Pavone | 474/148 |
| 4,625,935 | 12/1986 | Zellweger | 248/297.1 |
| 4,780,178 | 10/1988 | Yoshida et al. | 422/99 X |
| 4,850,560 | 7/1989 | Russ | 748/295.1 |
| 5,100,284 | 3/1992 | Boisseau | 74/89.22 X |
| 5,152,375 | 10/1992 | Zellweger | 187/21 |

Primary Examiner—Milton Cano
Attorney, Agent, or Firm—Shoemaker and Mattare, Ltd.

[57] ABSTRACT

A height adjustable stand for laboratory equipment, in particular for rotary evaporators, possesses a holder arrangement (6). The holder arrangement is able to be displaced vertically on a stand post (5). By way of a motor driven lifting arrangement (9, 11), the holder device (6) can be vertically raised or lowered. A coupling (12) is provided between the holder arrangement (6) and the lifting arrangement (9, 11) for the powered connection and its release.

6 Claims, 2 Drawing Sheets

HEIGHT ADJUSTABLE STAND FOR LABORATORY EQUIPMENT

The invention concerns a height adjustable stand for laboratory equipment, in particular for rotary evaporators, according to the claims.

Height adjustable stands for laboratory equipment, in particular for rotary evaporators, are known and in use in the most varied versions. EP-A1-149 972, for example, shows a height adjustable stand with which the holder arrangement of the stand is able to be raised or lowered with the help of an energy accumulator. In CH-PS-664 503, a lifting device for a rotary evaporator has been made known, with which a holder arrangement, which is vertically displaceable on the stand post, is raised, respectively lowered by means of a spindle. The spindle is driven by an electric motor. Through switching the motor on and off, the lifting device can be controlled.

A principle problem concerning these types of lifting devices is on the one hand that they should be raised and lowered relatively slowly, but on the other hand that situations can arise where very rapid lifting is necessary. This will occur, for example, in the case of rotary evaporators when the evaporator flask must be raised very rapidly out of the heated bath in order to interrupt an evaporating process or a reaction. The height of the holder arrangement should also be able to be manually adjusted, which is not possible with conventional motor drives.

The invention has the purpose of avoiding the disadvantages of these known devices, in particular, therefore, of creating a height adjustable stand and a method of height adjustment of the holder arrangement of a stand, which enables with the simplest of constructions not only manual but also powered displacement into any desired operating position. This means not only with an activated motor drive, but also with the motor drive at rest.

According to the invention, this purpose is solved in accordance with the characteristics of the patent claims.

Fundamental to the invention is that the coupling is provided between the holder arrangement, which is displaceable on the stand post, and the lifting arrangement. In this way the holder arrangement can be disengaged at any time, both with a running motor and with a stationary motor. In this way, on the one hand intervention in the process can be exceptionally rapid, and on the other hand both the raising and the lowering sequences can also be interrupted, since the coupling is simply released, also with the motor running. In the case of failure of the motor, the holder arrangement can be likewise manually raised or lowered without problems and can be firmly locked into position once again through simple engagement of the coupling.

The invention can be realised in a particularly simple way if the lifting arrangement is an endless transporter, arranged to be approximately parallel to the stand post. Spindle drives, and circulating belt, band or chain drives have proved themselves as endless transporters. At rest, the holder arrangement is connected to the transporter by the coupling arrangement and is thus held at its respective height. In operation, through disengagement of the coupling, the raising or lowering movement of the holder arrangement can be interrupted at any time, due to the fact that the coupling arrangement is released. The endless transporter will simply continue to run in such a case, until it is switched off. Subsequently, the coupling can be re-engaged. Carrier elements, which can be engaged with the transporter through frictional contact or an interlocking fit, have particularly proved themselves as couplings. When using a spindle drive, the carrier element can be any desired arrangement of claws which are able to be engaged with the spindle threads and which are able to be transported by these. With that, particularly efficient transmission of power will arise if the carrier element is a type of partial thread which is able to be laterally brought into complimentary contact with the spindle.

In the case of chain transporters, for example a sprocket type element can be pressed laterally into the chain links. In the case of band or belt transporters, clamping arrangements can be provided which are, for example, placed under spring tension and which can be clamped to the running band or to the stationary band.

The invention can be realised in a particularly advantageous way if the holder arrangement is provided with a handle for grasping and manual lowering or raising. With that, single handed engagement or disengagement of the coupling can be particularly well realised if an activation element for the coupling is provided on the handle.

Examples and embodiments of the invention are more closely described in the following, illustrated by the drawings.

Figure 1:
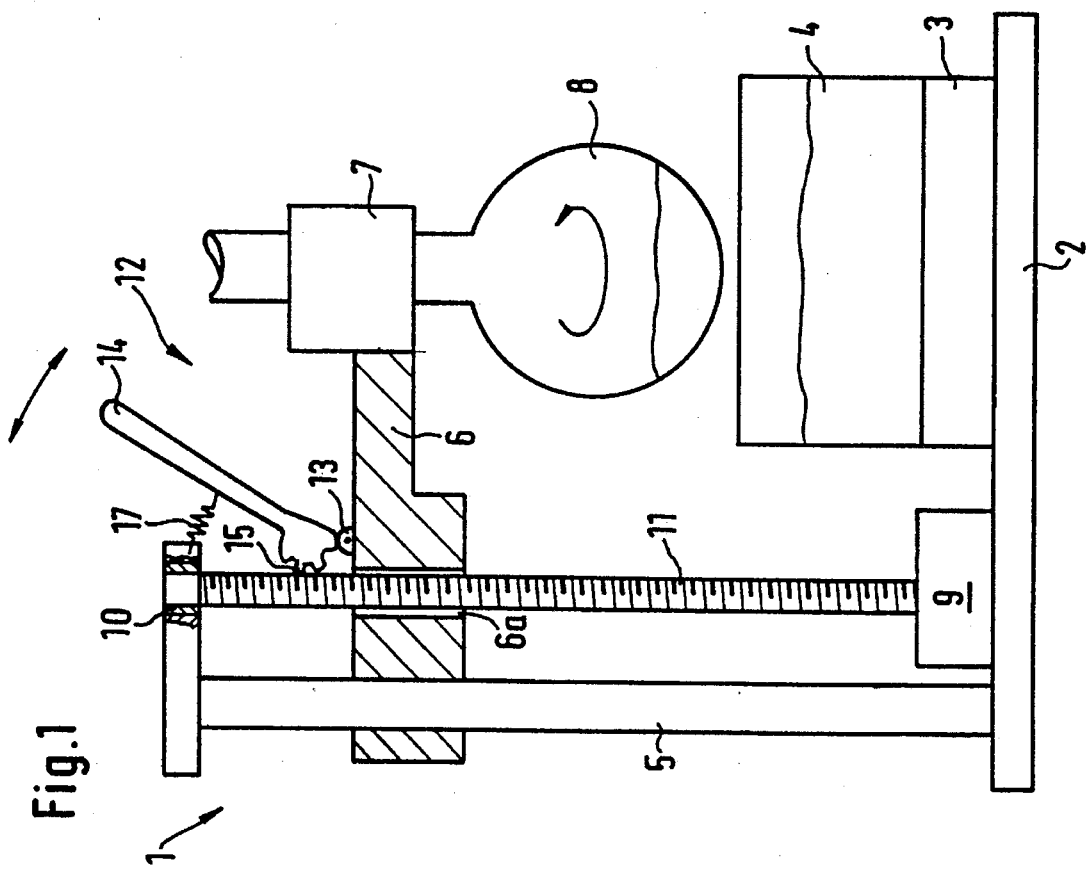

Namely:

FIG. 1 schematic representation of a stand with the features of the invention,

FIG. 2 a modified version of a stand with the features of the invention, and

Figure 3:
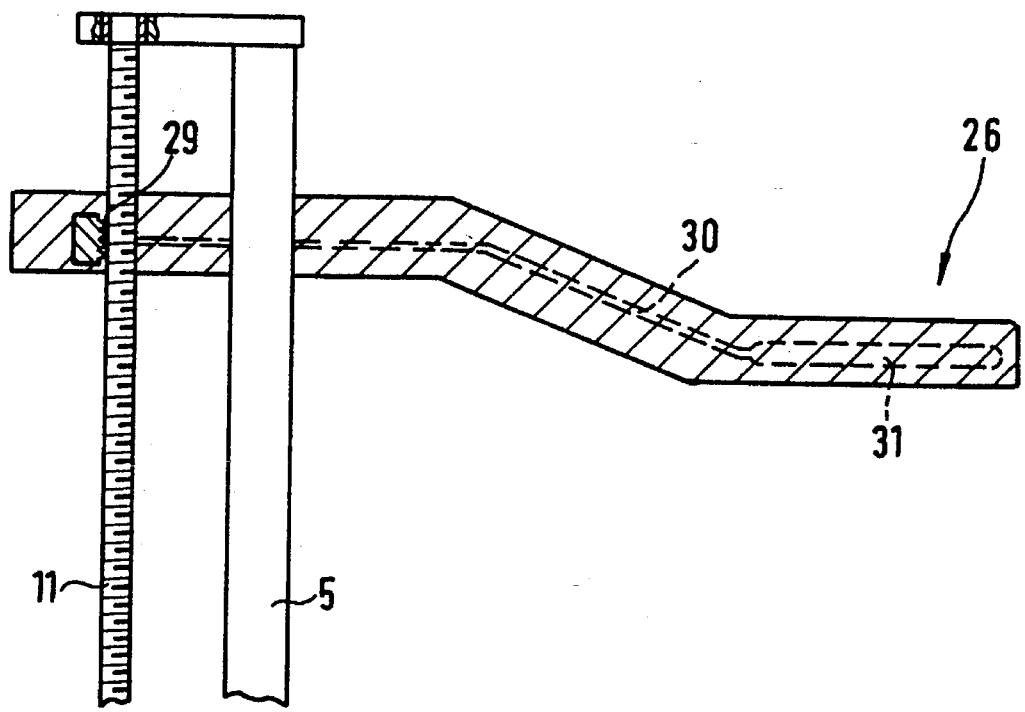
Figure 4:
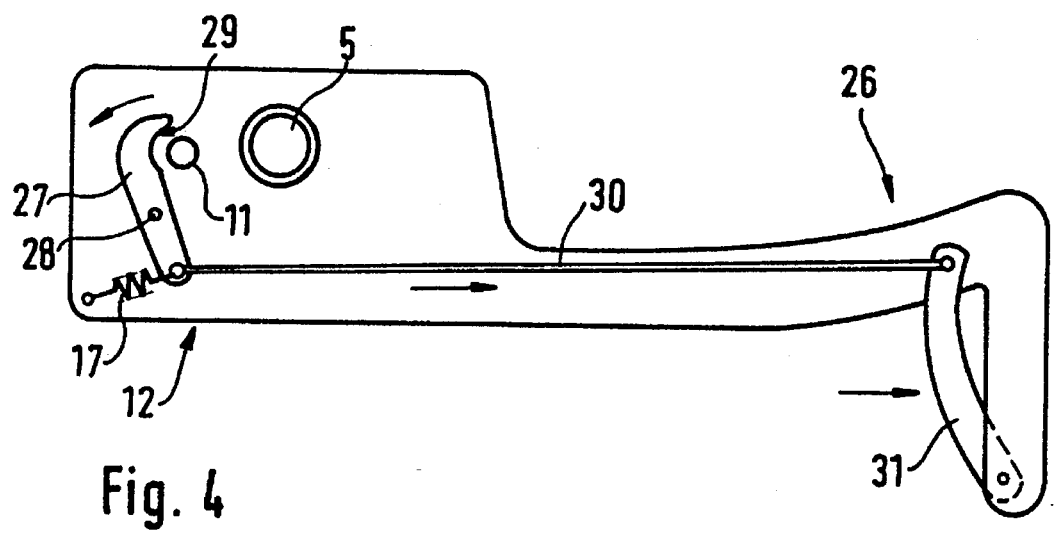

FIGS. 3 and 4 a stand according to the invention in cross section, in schematic side view, respectively in plan view.

According to FIG. 1, a stand 1 for a rotary evaporator possesses a base plate 2 with a heating device 3 and a heated bath 4. A stand post 5, which supports a holder arrangement 6, is fixed to the base plate 2. Fixed onto the flask holder arrangement 6 is a rotational drive 7, not shown in any greater detail here, for the evaporator flask 8. An electric motor 9 is provided in order to raise and lower the holder arrangement 6, respectively the evaporator flask 8 out of, respectively into the heated bath 4, said motor supporting a spindle 11 which is arranged parallel to the stand post 5 and which is able to rotate in a bearing 10. The spindle 11 runs through a bore 6a in the holder arrangement 6 in which it can rotate freely. A coupling clutch 12, with which the holder arrangement 6 is able to be brought into driving contact with the spindle 11, is provided on the holder arrangement 6.

The coupling 12 possesses a release lever 14 which is able to pivot on a linkage 13 and which possesses a number of claws 15 on its side oriented towards the spindle 11, said claws engaging in the spindle thread. The lever is, with that, pressed by a spring 17 against the spindle 11 in such a way that the claws engage firmly with the spindle 11 and provide the drive connection between the spindle 11 and the holder arrangement 6. Through activation of the lever 14 in a clockwise direction, the claws 15 are evidently separated from the spindle 11 so that the holder arrangement 6 can be displaced manually on the stand post 5. Such activation can, for example, also ensue with a stationary spindle 11 in order to manually raise or lower the holder arrangement 6, respectively the evaporator flask 8. However, the lever 14 can also be activated with a rotating spindle 11, for example in order to prevent excessive lowering or fouling of the evaporator flask.

Naturally, the coupling 12 can also be additionally provided with an electrical activation element. With the use of such a modification, according to FIG. 1, for example a pull-type electromagnet can act upon on the lever 14 and can pivot the lever into the engagement, respectively the disengagement position.

In the embodiment according to FIG. 2, in place of a spindle, a circulating V-belt 20 is provided which is driven by a drive pulley 21 and is deflected by two deflection pulleys 22, 23. The drive pulley 21 can be driven in both rotational directions by an electric motor which functions as an elevator drive and is not shown here. In the embodiment according to FIG. 2, the coupling comprises a clamping device with a clamping portion 24 which is firmly fixed onto the holder arrangement 6 and a moveable clamping portion 25 which, through the action of the spring 17, is pretensioned in the direction of the fixed portion 24 in such a way that the V-belt 20 is grasped and frictionally held between the two clamping portions 24, respectively 25. In this coupled or clamped position, every movement of the V-belt 20 consequently causes a raising or lowering of the holder arrangement 6. To release the coupling, the lever 14 is activated against the force of the spring 17 so that the the clamping portion 25 releases the V-belt 20.

Naturally, instead of a V-belt other endless transport means can be used, for example bands, wires, cables, chains or toothed belts, without as a result departing from the basic principle of the invention.

With the embodiment according to FIGS. 3 and 4, for the purposes of clarity only the holder arrangement 6 is shown in connection with the stand post 5 and the spindle 11. A handle 26, for simplification of operation, is provided on the holder arrangement 6, with which the holder arrangement 6 can be manually raised or lowered on the stand post 5 after disengagement of the coupling. At the same time, the coupling 12 possesses a lever 27 which can be pivoted about a point of rotation 28. The lever 27 is provided with a number or partial threads 29 on its side oriented towards the spindle 11. The spring 17 presses the lever 27, respectively the partial threads 29 against the spindle 11 in such a way that an interlocking drive connection arises. The lever 27 is connected by a pull rod 30 to an activation element 31 which is arranged on the handle 26. In this way, through single handed pressure on the activation element 31, first of all the lever 27 can be pivoted against the force of the spring 17 and thus the holder arrangement 6 can be disengaged from the spindle 11. Subsequently, by means of the handle 26, the holder arrangement 6 can be raised or lowered in the simplest way.

Evidently, the lifting arrangement can also be a stationary toothed rack, in place of the spindle 11, in which a worm gear engages, said worm gear being mounted on the holder arrangement 6 and driven by a motor which is likewise mounted on the holder arrangement 6. With such a kinematic exchange, it must merely be ensured that the said worm gear can be separated from the toothed rack. This and other modifications are common knowledge to the expert.

Inasmuch as the invention is subject to modifications and variations, the foregoing description and accompanying drawings should not be regarded as limiting the invention, which is defined by the following claims and various combinations thereof:

I claim:

1. A height adjustable stand for a laboratory flask, comprising:

a vertical stand post;

a flask holder supported on said post for movement therealong;

a motorized continuous elevator drive for moving the flask holder at a predetermined speed, said elevator drive comprising a helically threaded, vertical, rotary spindle;

a normally engaged clutch connecting the elevator drive to the flask holder, said clutch comprising toothed means for engaging said spindle thread; and means for manually releasing said clutch so that the flask holder can be moved independent from said elevator drive, said releasing means comprising a manually operable release lever pivotally mounted on said flask holder and connected to said toothed means, for moving said clutch means between engaged and disengaged positions with respect to said spindle.

2. The invention of claim 1, further comprising means for biasing said lever and said toothed means toward said engaged position.

3. A height adjustable stand for a laboratory flask, comprising:

a vertical stand post;

a flask holder supported on said post for movement therealong;

a motorized continuous elevator drive for moving the flask holder at a predetermined speed, said elevator drive comprising an endless flexible member following a substantially vertical path;

a normally engaged clutch connecting the elevator drive to the flask holder; and means for manually releasing said clutch so that the flask holder can be moved independent from said elevator drive.

4. The invention of claim 3, wherein said flexible member is a belt.

5. The invention of claim 4, wherein said belt is a toothed belt.

6. The invention of claim 3, wherein said flexible member is a chain.

\* \* \* \* \*